United States Patent [19]

Brown et al.

[11] Patent Number: 4,557,448
[45] Date of Patent: Dec. 10, 1985

[54] CLAMPING ASSEMBLY

[75] Inventors: Marvin L. Brown; Ronald T. Jarrett, both of West Burlington, Iowa

[73] Assignee: J. I. Case Company, Racine, Wis.

[21] Appl. No.: 718,579

[22] Filed: Apr. 1, 1985

[51] Int. Cl.[4] .............................................. A62C 23/04
[52] U.S. Cl. ........................................ 248/75; 248/56
[58] Field of Search .................... 248/75, 51, 56, 68.1, 248/74.1, 74.4, 231.3, 316.2; 285/161; 137/899

[56] References Cited

U.S. PATENT DOCUMENTS

| 1,126,531 | 1/1915 | Liebmann ...................... 248/73 UX |
| 2,099,465 | 11/1937 | Burleson ............................. 248/74.4 |
| 2,661,919 | 12/1953 | Johnson et al. ........................ 248/56 |
| 2,889,602 | 6/1959 | Maniaci ........................... 248/68.1 X |
| 3,330,516 | 7/1967 | Vincent ............................ 248/74.4 X |
| 3,633,858 | 1/1972 | Houston et al. ................ 248/74.4 X |
| 4,265,420 | 5/1981 | McCormick ........................... 248/56 |

FOREIGN PATENT DOCUMENTS

| 1342747 | 9/1963 | France ................................... 248/56 |
| 1221559 | 2/1971 | United Kingdom .................. 248/75 |

Primary Examiner—J. Franklin Foss
Attorney, Agent, or Firm—Cullen, Sloman, Cantor, Grauer, Scott & Rutherford

[57] ABSTRACT

A clamping assembly for hoses which are connected between a tractor and piston-cylinders on an attached implement such as a backhoe. The clamping assembly includes a base and at least one releasable clamping element. Each hose is strung through an opening in the base and abutted against an arcuate wall. The clamping element also includes an arcuate wall which engages the opposite side of the hose. The clamping element is secured in position by a bolt fastener. The clamping element includes opposed upstanding lugs which are spaced apart far enough to permit the head of the bolt fastener to slide between them. After the head of the bolt is positioned between the lugs, it cannot be turned, and therefore, a nut may be conveniently tightened on the bolt without the need for an additional tool to hold the head of the bolt. Further, angled surfaces on the base and clamping element provide for clamping or wedging action as the bolt is tightened.

5 Claims, 4 Drawing Figures

U.S. Patent    Dec. 10, 1985    4,557,448
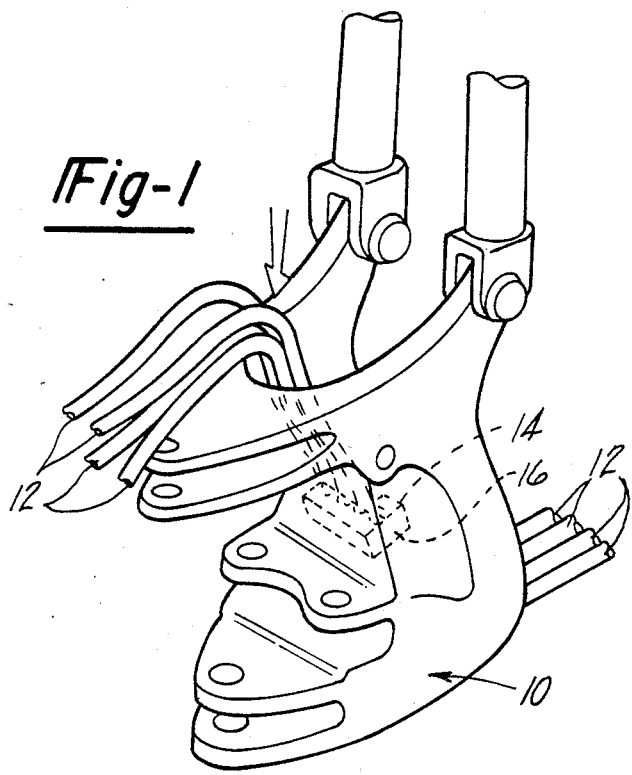
Fig-1
Fig-2
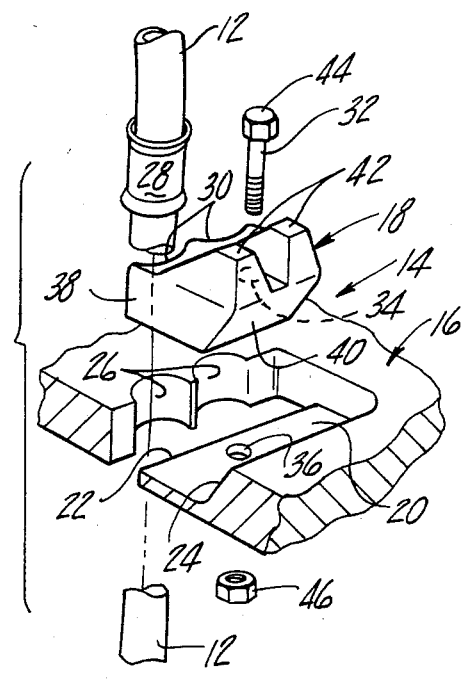
Fig-4
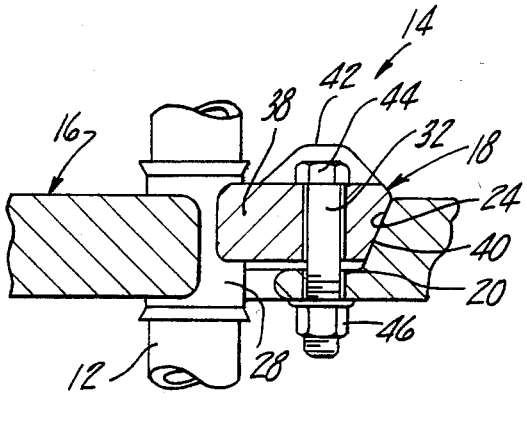
Fig-3

CLAMPING ASSEMBLY

BACKGROUND OF THE INVENTION

The present invention relates to a clamping assembly for the hydraulic feed lines or hoses which are connected between a tractor and the operating piston-cylinders on an attached implement such as a backhoe.

It is conventional to provide feed lines or hoses between a tractor and an implement which is attached to the tractor. These feed lines or hoses are typically connected between one or more valves and piston-cylinders on the implement for transmitting the pressurized fluid that is necessary to operate the piston-cylinders for maneuvering associated elements on the implement. In the case of a tractor mounted backhoe, there are a plurality of these hoses which extend from the tractor to the piston-cylinders on the backhoe implement. Since these hoses cannot be left to simply dangle or hang due to the moving parts which may break or damage them, a means must be provided for keeping the hoses organized and out of the way while permitting enough available hose length to accommodate movement of the backhoe arm members.

The hitch assembly between the tractor and backhoe implement provides a suitable intermediate location for securing the hoses which extend from the tractor. The hoses can be strung through the housing formed by the hitch assembly which will protect them and prevent their interference with the shifting movement of the backhoe relative to the tractor. However, a problem exists in attempting to secure the hoses within the closely confined area of the hitch assembly.

In particular, it is very difficult for the installer to use normal clamping devices having bolts in this area because known constructions require the installer to use two wrenches, one for holding the bolt head and the other for tightening the nut. Since the space within the hitch assembly is limited, it is very difficult for the installer to reach or tighten the bolts on these known clamping devices. Thus, there has been a need for a clamping assembly for these hydraulic hoses which permits ease of installation.

SUMMARY OF THE INVENTION

The present invention provides an easily assembled clamping device which aligns, organizes and secures hoses to keep them out of the way of each other as well as moving parts on an implement which might otherwise crimp or damage the hoses. The clamping device of the present invention is particularly adapted for use within a hitch assembly for a conventional backhoe wherein a plurality of hydraulic hoses extend from a tractor and are connected to various piston-cylinders that are used for controlling the movement of the backhoe.

The clamping assembly consists of a base and at least one removable clamping element. The base includes an opening through which the hoses are inserted and an angled bearing wall which is cooperable with the clamping element. The base is secured to the hitch assembly at any desired position which will keep the hoses organized and out of the way while permitting enough available hose length to accommodate movement of the backhoe arm members.

The hoses are initially strung through the opening in the base. Each hose is aligned with and abutted against a semi-circular wall in the base which temporarily holds the hose until the clamping element can be secured against it. An outer metal sleeve may be located around each hose at the area of clamping to provide additional protection to the hose. The clamping element includes at least one complementary semi-circular wall which engages the opposite side of a respective hose. The clamping element is secured in clamping position by means of a bolt fastener which passes through an opening in the clamping element and through an opening in the base.

The clamping element includes a generally rectangular base portion having semi-circular walls on one end and an angled or inclined wall on its other end. The clamping element further includes opposed upstanding lugs which are spaced apart far enough to permit the head of the bolt fastener to slide between them. After the head of the bolt is positioned between the lugs, it cannot be turned, and therefore, a nut may be conveniently tightened to the bolt from the underside of the base without the need for an additional tool to hold the head of the bolt.

Thus, the clamping element lugs are spaced apart slightly more than the width of the bolt head which prevents turning of the bolt head and allows the bolt to be secured with one wrench. Further, the angled surfaces on the clamping element and base provide a clamping or wedging action as the bolt is tightened. Since the clamping mechanism only requires the clamping element, and the clamping bolt is installed perpendicular to the clamping element, an assembly is provided which allows easier installation in the closely confined area found within the backhoe hitch assembly.

Other advantages and meritorious features of the clamping assembly will be more fully understood from the following description of the invention, the appended claims and the drawings, a brief description of which follows.

BRIEF DESCRIPTION OF THE DRAWINGS

FIG. 1 is a perspective view of a backhoe hitch assembly including the clamping device of the present invention.

FIG. 2 is a top plan view of the clamping assembly.

FIG. 3 is a cross-sectional view taken along line 3—3 in FIG. 2.

FIG. 4 is an assembly view illustrating the individual components of the clamping device.

DETAILED DESCRIPTION OF THE INVENTION

Referring to FIG. 1, a hitch assembly 10 for a conventional backhoe (not shown) is partially shown for the purpose of illustrating the preferred environment in which the present invention is utilized. As is conventional, a plurality of hydraulic hoses 12 extend from a tractor (not shown). These hoses are connected to various piston-cylinders (not shown) which are used for controlling the movement of the backhoe.

The present invention relates to a clamping assembly 14 which aligns, organizes and secures hoses 12 to keep them out of the way of each other as well as moving parts on the backhoe which might otherwise crimp or damage the hoses. Clamping assembly 14 consists of a base 16 and at least one clamping element 18. Base 16 includes a bearing surface 20, an opening 22, and an angled wall 24. Base 16 is secured to hitch assembly 10 at any desired position, one such position being shown in FIG. 1.

Hoses 12 are initially strung through opening 22 in base 16. Each hose is aligned with and abutted against a semi-circular wall 26 in base 16 which temporarily holds the hose until clamping element 18 can be secured against it. An outer metal sleeve 28 may be located around each hose 12 at the area of clamping to provide protection to the hose. Clamping element 18 includes at least one semi-circular wall 30 which engages the opposite side of a respective hose 12 as shown in FIGS. 2 and 3. Clamping element 18 is secured in position by means of a bolt fastener 32 which passes through opening 34 in clamping element 18 and through opening 36 in bearing surface 20.

Clamping element 18 includes a generally rectangular base portion 38 having the semi-circular walls 30 on one end and an angled or inclined wall 40 on its other end. Element 18 further includes opposed upstanding lugs 42 which are spaced apart far enough to permit the head 44 of bolt 32 to slide between them. After the head 44 of bolt 32 is positioned between lugs 42, it cannot be turned, and therefore, nut 46 may be conveniently tightened from the underside of base 16 without the need for an additional tool to hold the head 44 of bolt 32.

Thus, lugs 42 are spaced apart slightly more than the width of bolt head 44 which prevents turning of head 44 and allows bolt 32 to be secured with one wrench. Further, angled surfaces 24 and 40 on base 16 and clamping element 18 provide for a clamping or wedging action as bolt 32 is tightened. Since the clamping mechanism only requires one element, i.e., the clamping element 18, and the clamping bolt 32 is installed perpendicular to the clamping direction, an assembly is provided which allows easier installation in the closely confined area found within backhoe hitch assembly 10.

It will be apparent to those skilled in the art that the foregoing disclosure is exemplary in nature rather than limiting, the invention being limited only by the appended claims.

We claim:

1. A clamping assembly for hoses which are connected between a tractor and piston-cylinders on an attached implement, said clamping assembly comprising:
   a base and at least one clamping element, said base including a bearing surface, an arcuate bearing wall, an opening for said hoses, and an angled bearing surface;
   each hose extending through said base opening and abutting against said arcuate base bearing wall;
   said clamping element including a base portion, an arcuate end wall, and an angled bearing wall, said clamping element further including opposed spaced apart legs extending from said base portion;
   a bolt fastener extending between the spaced apart legs on said clamping element through an opening in said clamping element and through an opening in said base bearing surface, and said bolt fastener having a head with the spacing between said legs being slightly more than the dimension of said head thereby preventing turning of said bolt fastener.

2. A clamping assembly as defined in claim 1 wherein said base arcuate bearing wall and said clamping element arcuate end wall being semi-circular.

3. A clamping assembly as defined in claim 1 wherein said base angled bearing surface and said clamping element angled bearing wall engaging one another for providing a clamping action as said bolt fastener is tightened.

4. The clamping assembly as defined in claim 3 wherein the axis of said bolt fastener being substantially perpendicular to the direction of clamping.

5. The clamping assembly as defined in claim 1 wherein said base arcuate bearing wall and said clamping element arcuate end wall each including a plurality of semi-circular arcuate surfaces for securing a plurality of hoses.

* * * * *